3,572,179
AUTOMATIC TRANSMISSION APPARATUS
Akira Akima, Tokyo, and Kazuyoshi Yoshida and Tomio Oguma, Saitama-ken, Japan, assignors to Honda Giken Kogyo Kabushiki Kaisha, Tokyo, Japan
Filed Feb. 26, 1969, Ser. No. 802,602
Int. Cl. B60k 21/06
U.S. Cl. 74—869          8 Claims

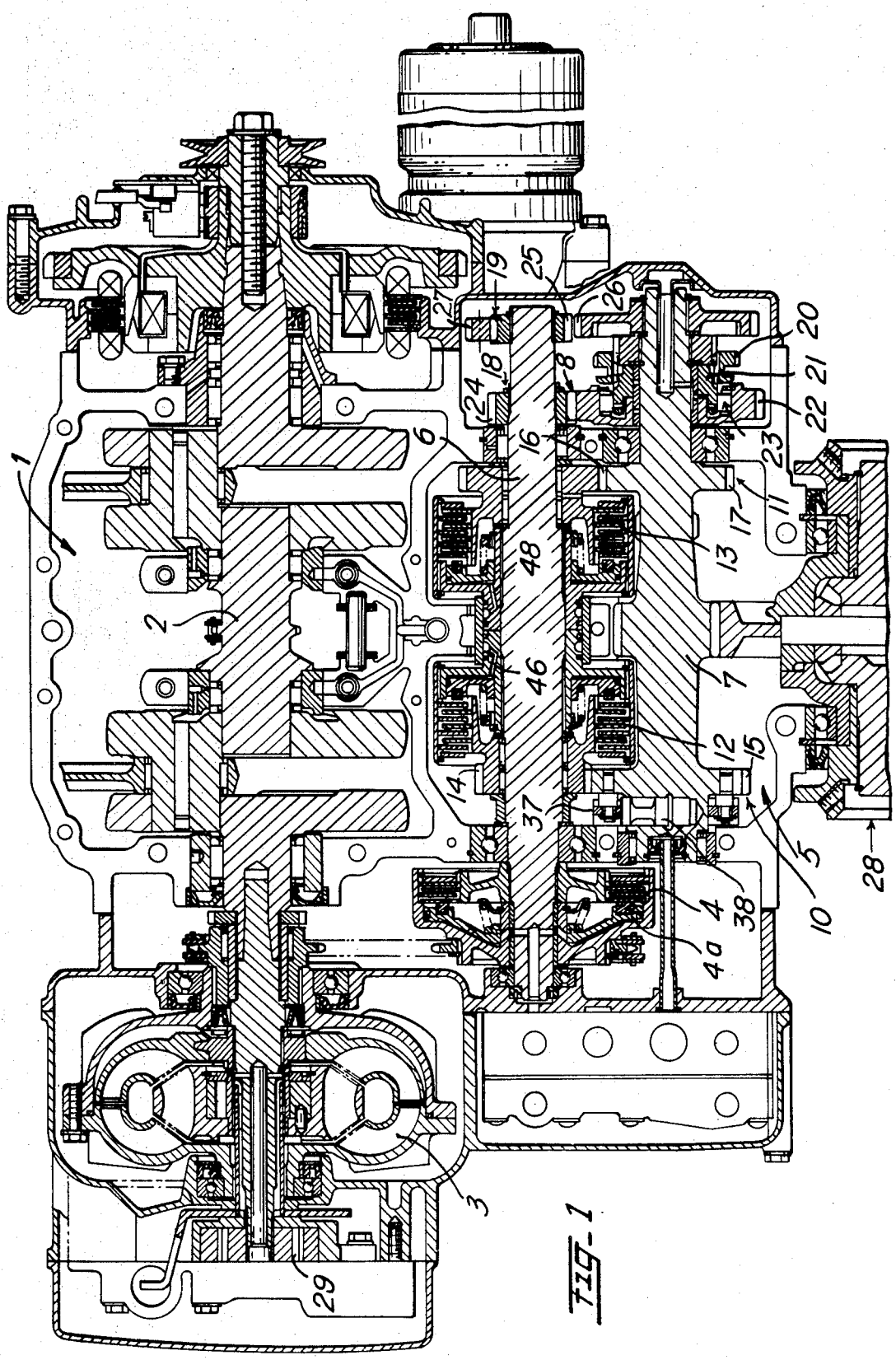

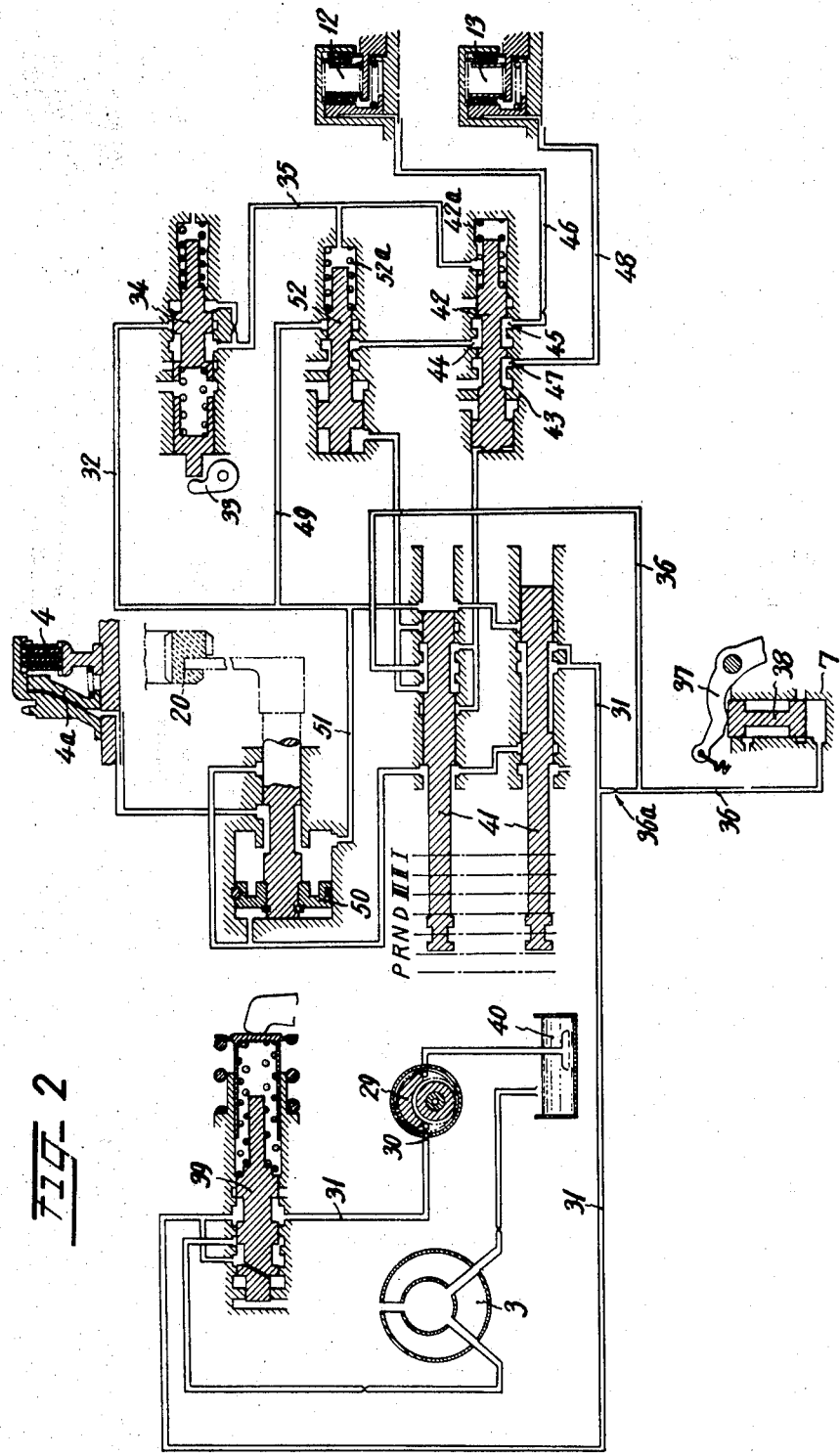

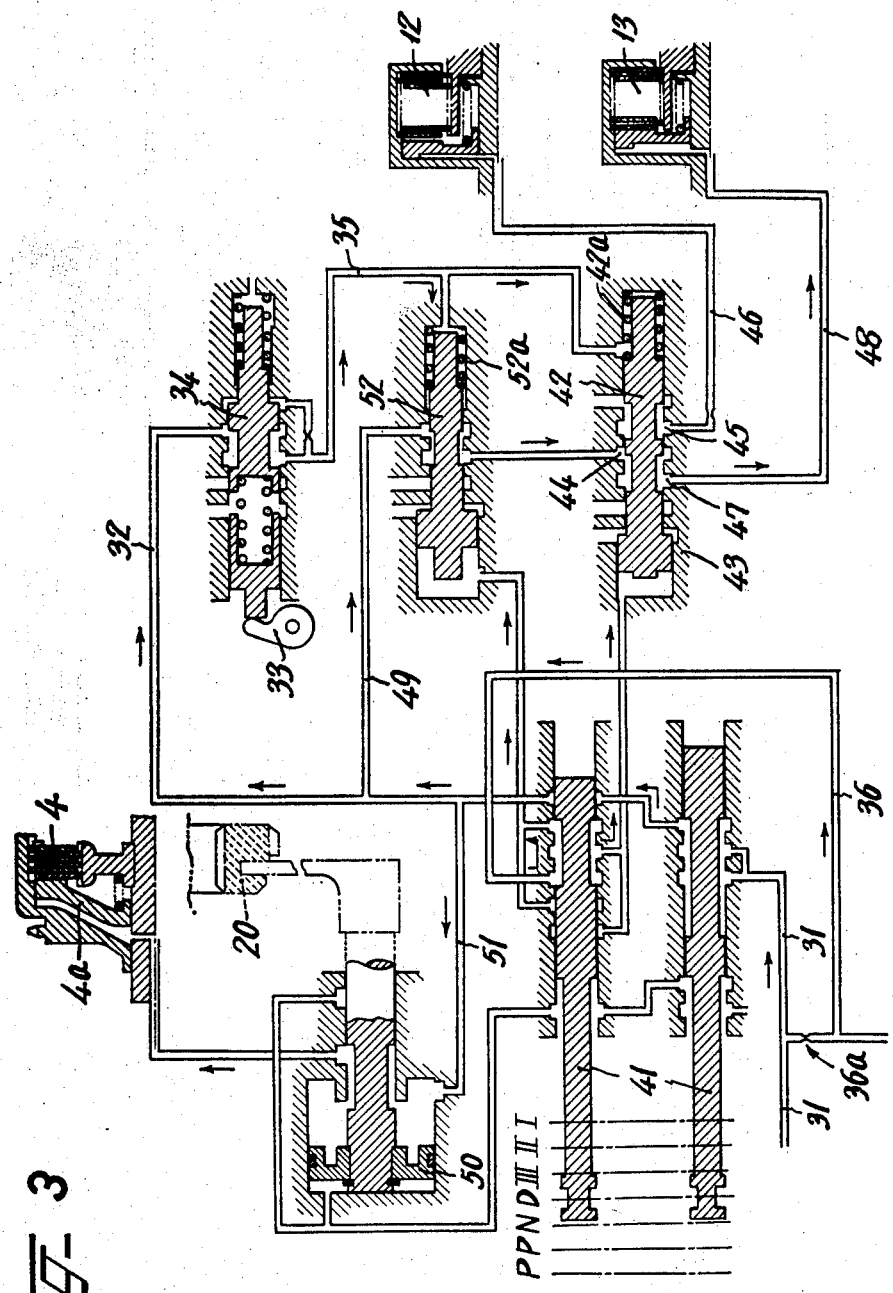

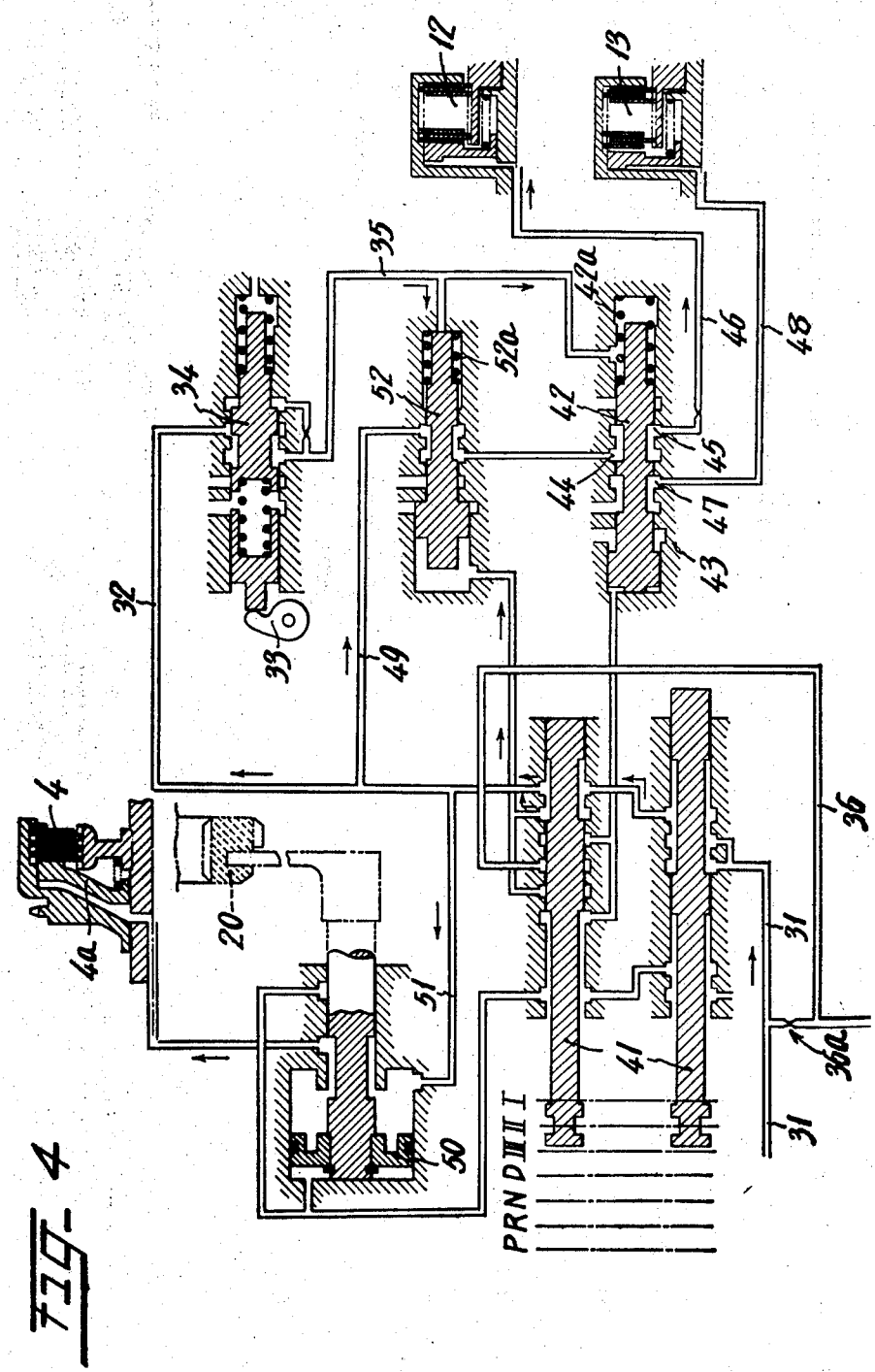

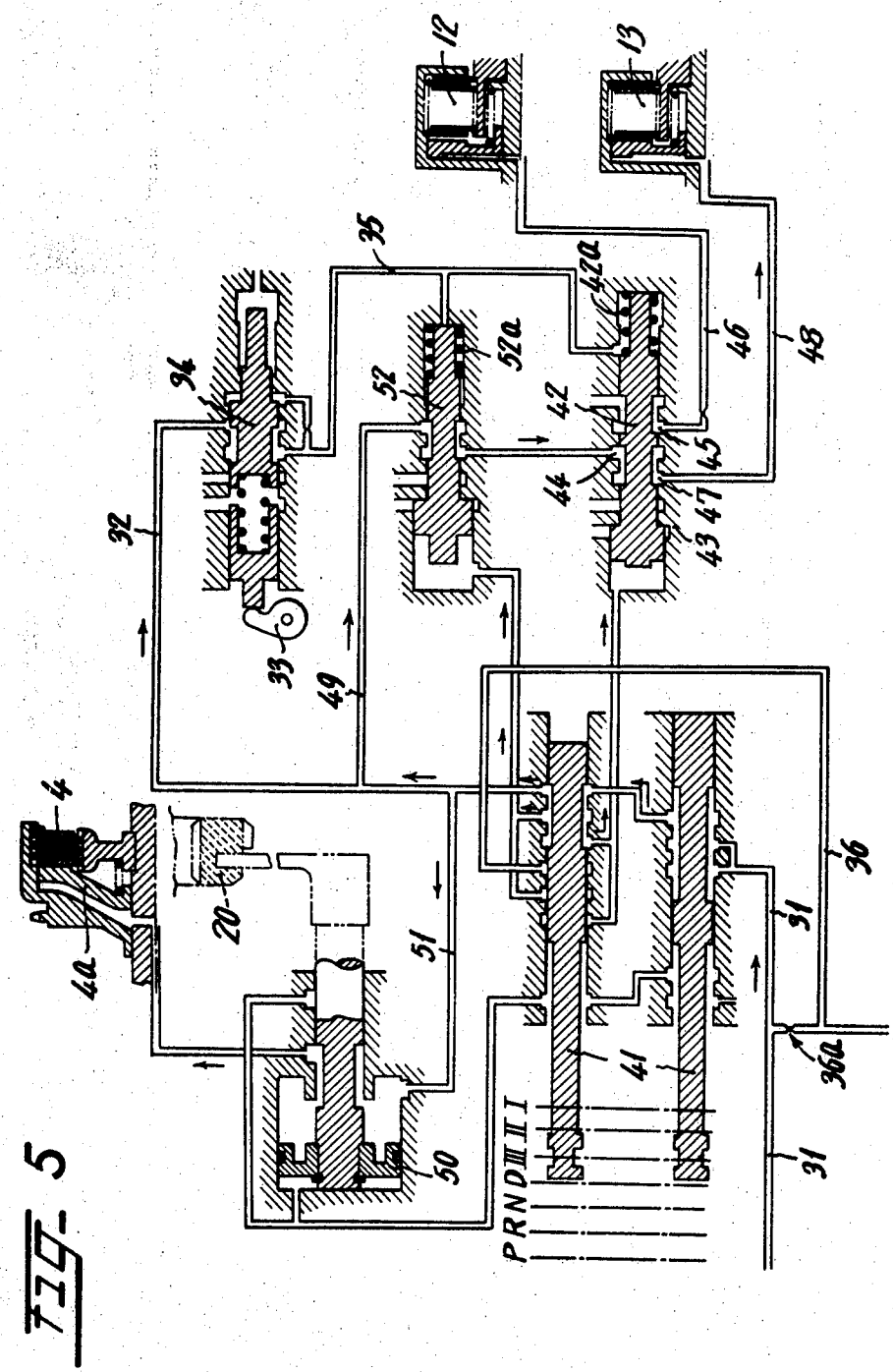

ABSTRACT OF THE DISCLOSURE

A valve is provided to control the selective supply of an operating pressure fluid to first and second friction clutches which respectively control the operation of low speed and a high speed transmission system of a speed change mechanism. The valve is displaceable between first and second positions and is subject to pressure fluid at its opposite ends, the pressure of the fluid at one end being related to engine output power and the pressure of the fluid at the other end being related to the speed of an output shaft of the transmission system. When the valve is in the first position, one clutch is activated whereas when the valve is in its second position the other clutch is activated.

BRIEF SUMMARY OF THE INVENTION

This invention relates to an automatic transmission apparatus, adapted chiefly for use in a motorcar, in which a low speed transmission system and a high speed transmission system are selectively operated by respective fluid pressure-operated friction engaging devices such as oil clutches or the like, and the apparatus is characterized in that there are provided a supply source of an operating pressure fluid, a supply source of a first control pressure fluid having a pressure corresponding to engine output power, a supply source of a second control pressure fluid having a pressure corresponding to the speed of rotation of an output shaft of the engine, and a pressure difference responsive valve arranged to be automatically displaced to either a first position or a second position in accordance with the difference in pressure of the pressure fluids acting on its opposite ends such that in the first position the first friction engaging device is connected to the supply source of the operating pressure fluid and in the second position, the second friction engaging device is connected to the supply source of the operating pressure fluid. The valve is arranged so that one end thereof is subject to the action of the first control pressure fluid whereas the other end is subjected to the action of the second control pressure fluid, so that the valve is positioned at its first position when the first control pressure is comparatively high and at its second position when the second control pressure is comparatively high.

The invention also contemplates the provision in such apparatus of a manually operable valve which can be displaced to a predetermined position so that the pressure difference responsive valve is maintained at the first position whereby only the first friction engaging apparatus, that is, only the low speed transmission system may be kept operative. Thus, when the manually operable valve is set at a low speed stage position, said other end of said pressure difference responsive valve is cut off from the supply of the second control pressure fluid and at the same time is opened to the atmosphere, whereby said valve is maintained at its first position by the action of the first control pressure fluid.

The invention also contemplates the provision in such apparatus that the pressure difference responsive valve can be maintained at the second position so that only the operation of the second friction engaging apparatus, that is, the operation of the high speed transmission system can be obtained. In this arrangement, the manually operable valve is displaceable to a high speed stage position and in this position said other end of the pressure difference responsive valve is cut off from the supply of the second control pressure fluid and is supplied with operating pressure fluid of comparatively high pressure, whereby the pressure difference responsive valve is maintained at its second position by overcoming the pressure of the first control fluid acting at said one end thereof.

BRIEF DESCRIPTION OF THE DRAWING

FIG. 1 is a sectional view of an embodiment of this invention,

FIG. 2 is a diagrammatic illustration of a fluid pressure circuit for operating the embodiment of FIG. 1, FIG. 3 shows part of the circuit at the time of an automatic speed-change operation, FIG. 4 shows part of the circuit at the time of a low speed stage restriction, and FIG. 5 shows part of said circuit at the of high speed stage restriction.

DETAILED DESCRIPTION

Refering to FIG. 1, numeral 1 denotes an internal combustion engine, and numeral 2 denotes a crank shaft thereof. The crank shaft 2 is connected to a speed-change mechanism 5 through a torque convertor 3 and an input clutch 4 of the friction engaging type operable by a pressure fluid. The speed-change mechanism 5 comprises an input shaft 6 and an output shaft 7 parallel to shaft 6, and a low speed transmission system 10 providing, for example, a second speed, and a high speed transmission system 11 providing, for example, a third speed. Systems 10 and 11 are disposed parallel with one another between the two shafts 6 and 7, so that these may be selectively coupled by respective first and second friction clutches 12 and 13 which are operated by pressure fluid.

The low speed transmission system 10 includes a gear 14 loosely mounted on the input shaft 6 and a gear 15 fixedly mounted on the output shaft 7 and in mesh with gear 14, so that when the corresponding friction clutch 12 is operated by being supplied with pressure fluid, the gear 14 is connected to the input shaft 6 for activating the low speed transmission system 10. The high speed transmission system 11 comprises a gear 16 loosely mounted on the input shaft 6 and a gear 17 fixedly mounted on the output shaft 7, so that by the operation of the corresponding clutch 13 the gear 16 is connected to the input shaft 6 for activating the transmission system 11.

In the illustrated embodiment, there is additionally, a third transmission system 18 providing, for example, a first speed, and a fourth transmission system 19 providing, for example, reverse speed, the systems 18 and 19 being mounted between shafts 6 and 7 so that either may be selected at will by a shift member 20 as will be explained more fully hereinafter. Namely, the transmission system 18 includes a one-way clutch 23 comprising an inner member 21 and an outer member 22 loosely mounted on the output shaft 7, the member 22 being a gear in mesh with a gear 24 fixedly mounted on the input shaft 6. The transmission system 19 includes a gear 25 fixedly mounted on the input shaft 6 and a gear 26 loosely mounted on the output shaft 7 and connected to gear 25 via an intermediate gear 27. In this way, respective transmission system 18 or 19 may be selected by moving the shift member 20 to the left for engagement with the inner member 21 or to the right for engagement with gear 26, said shift member 20 coupling member 21 or gear 26 to the output shaft 7 when engaged therewith. The second speed and the third speed can be obtained respectively if the two clutches 12 and 13 are selectively activated, and the input clutch 4 is engaged, and the shift member 20 moved to the left in the drawing. If both clutches 12 and 13 are then opened, first speed is obtained, whereas if the member 20 is moved to the right reverse speed is obtained. Numeral 28 denotes a differential gear apparatus connected to the output shaft 7 of the speed-change mechanism 5 and the power for driving the wheels may be delivered by respective output shafts on opposite sides thereof.

A circuit for a pressure fluid, such as oil, or the like, for operating each member mentioned above is constructed as shown in FIG. 2.

Therein, an oil pressure pump 29 driven by the engine 1 is positioned so that an operating fluid of comparatively high pressure may be obtained within a passage 31 connected to a discharge outlet 30 of the pump. A passage 32 is connected to said passage 31 through a manually operable valve 41 to be described more fully hereinafter. The passage 32 is connected to a passage 35 through a pressure control valve 34 which is opened (by being displaced to the right in FIG. 2) by an output detecting member 33 adapted to turn and open valve 34 in relation to increase in the output power of the engine 1. Thus a first control pressure fluid having a pressure corresponding to the engine output power may be obtained within the passage 35. Additionally, a passage 36 connected through an orifice 36a to the passage 31 of the operating pressure fluid is provided with a pressure control valve 38 which is closed (by being lowered in FIG. 2) by a speed detecting member 37 arranged to close valve 38 in accordance with increase in the speed of rotation of the output shaft, so that a second control pressure fluid having a pressure corresponding to the speed of the output shaft may be obtained within the passage 36. The orifice 36a is arranged for limiting the intake amount of the pressure fluid and serves so that the pressure change in either one of the two passages 31 and 36 does not influence the other.

Numeral 39 denotes a pressure control valve interposed in the passage 31 so that the valve 39 serves to automatically control the fluid pressure within the passage 31 to a value corresponding to the stator reaction force in the troque convertor 3. Numeral 40 denotes a fluid reservoir connected to the suction side of the pump 29.

The output power detecting member 33 may be, for instance, a lever movable with the accelerator pedal of the engine 1 and, the speed detecting member 37 may be, for instance, a lever operable by a centrifugal weight.

Numeral 41 denotes a manually operable selector valve. The valve 41 is positioned in the neutral position N in FIG. 2 and when the valve is displaced to an automatic speed change position D, an automatic speed-change operation may be obtained. This is achieved by a pressure difference responsive valve 42 which is automatically displaceable to the left in a first position and to the right in a second position, in accordance with the pressure diffrerence of the pressure fluids acting on its both ends as will be explained more fully hereinafter. The valve 42 is provided within a valve housing 43 so that in its first position an inlet opening 44 on one side of the housing 43 is connected to the first friction clutch 12 through an outlet opening 45 on the other side thereof via a passage 46 and in its second position said inlet opening 44 is connected to the second friction clutch 13 through a second outlet opening 47 via a passage 48.

If the manually operable valve 41 is now in the automatic speed-change position D as shown in FIG. 3 and the engine output power is increased, the first control pressure fluid in the passage 35 acts on the right end of the responsive valve 42 and at the same time the second control pressure fluid within the passage 36 acts on the left end of valve 42 and additionally the operating pressure fluid within the passage 31 is supplied to the inlet opening 44 from the passage 32 through a diverged passage 49.

Accordingly, the valve 42 is automatically urged to either the first position or the second position by the pressure difference of the pressure fluids acting on the opposite ends of said valve, that is, by comparison of the engine output power and the speed of the output shaft. If the speed of the output shaft is small as compared with the engine output power, the valve 42 is brought to the first position, so that the first friction clutch 12 is supplied with the operating pressure fluid, whereby the low speed transmission system 10 is operated, whereas if the speed of the output shaft is comparatively large, the valve 42 is brought to the second position, so that the second friction clutch 13 is supplied with the operating pressure fluid, whereby the high speed transmission system 11 is operated. Thus, the vehicle is subjected to an automatic speed-change operation during running by being automatically switched to either the second speed or the third speed.

In this case, the input clutch 4 is simultaneously supplied with the operating presure fluid to be in the operative condition and at the same time the shift member 20 is also supplied with the operating pressure fluid for being positioned at the left hand shifted position. Namely, an operating cylinder 4a for the input clutch 4 and an operating cylinder 50 for the shift member 20 are positioned so that when the valve 41 is brought to the position shown in FIG. 3, the operating pressure fluid within the passage 31 is supplied thereto through a passage 51.

During the automatic speed change operation mentioned above, first speed can also be obtained automatically by the following arrangement. Namely, a second pressure difference responsive valve 52 similar to the foregoing responsive valve 42 is interposed in the passage 49 connecting the inlet opening 44 of the responsive valve 42 to the operating pressure fluid source. The valve 52 is identical to the responsive valve 42 in that the first control pressure fluid in passage 35 is applied to the right end thereof and the second control pressure fluid in passage 36 is applied to the left end thereof, but the valve 52 is distinguishable from valve 42 by the arrangement that the left hand pressure receiving surface of valve 52 is designed to be somewhat large in comparison therewith and that at the left hand first position thereof the passage 49 is closed and the first and second friction clutches 12 and 13 are opened and at the second position thereof the passage 49 is opened.

If, accordingly, during the automatic speed-change operation, the speed of the output shaft increases, thus causing the second control pressure fluid pressure to become comparatively high enough to move the two valves 42 and 52 to the right, the second friction clutch 13 is operated to provide the third speed, and if said pressure is then lowered, the valve 42 is first moved to the left to operate the first friction clutch 12 alone to provide the second speed as mentioned before. If said pressure is lowered further, the valve 52 also is moved to the left to make the first friction clutch 12 also inoperative and as a result the first speed is provided. Springs 42a and 52a urge respective valves 42 and 52 to the left.

In further accordance with the invention, the foregoing automatic speed-change operation is stopped and can be restricted to the condition in which only the first friction clutch 12 operates, that is, to the second speed, regardless of the engine output power and the speed of the output shaft. To effect this, the manually operable valve 41 is set at the second speed position II as shown in FIG. 4.

When so set, the left end of the responsive valve 42 is cut off from the passage 36 of the second control pressure fluid and is opened to the air, so that the valve 42 is moved to the left end to be maintained at that position by the auxiliary spring 42a and the first control pressure fluid acting on the right end, and thus it is restricted to the condition where only the first friction clutch 12 operates, that is, to the second speed.

In further accordance with the invention, the change-speed operation can be restricted to the condition where only the second friction clutch 13 operates, that is, to the third speed. To effect this, the valve 41 is placed at the third speed position III as shown in FIG. 5.

When so placed, the left end of the valve 42 is supplied with operating pressure fluid (instead of the second control pressure fluid) so that the valve 42 is moved to the right for being held at that position by the pressure of the operating pressure fluid as a result of its overcoming the first control pressure fluid pressure acting on the right end thereof. Thus, the apparatus becomes maintained at the third speed position and only the second friction clutch 13 is operated.

The manually operable valve 41 additionally has a first speed position I for fixing the apparatus at the first speed and also a reverse position R for fixing the apparatus in reverse.

Thus, according to this invention, the first control pressure fluid having a pressure corresponding to the engine output power and the second control pressure fluid having a pressure corresponding to the speed of the output shaft are arranged to act on the pressure difference responsive valve so that said valve may be automatically switched into the either first position or the second position, and accordingly the low speed transmission system and the high speed transmission system may be selected automatically for effecting an automatic speed-change operation smoothly and accurately. Additionally, one end of the valve can be released from the pressure fluid or acted on by another high pressure fluid, respectively, so that the automatic speed-change operation can be suspended and at the same time operation can be held at only the low speed transmisson system or that of only the high speed transmission system, and such switching can be simply obtained by a single operation of the manually operable valve.

What is claimed is:

1. An automatic transmission apparatus of the type having a speed-change mechanism connected to an internal combustion engine and provided with a low speed transmission system operable by a fluid pressure-operated first friction engaging device and a high speed transmission system operable by a fluid pressure-operated second friction engaging device, said apparatus comprising a supply source of an operating pressure fluid, a supply source of a first control pressure fluid having a pressure corresponding to engine output power, a supply source of a second control pressure fluid having a pressure corresponding to the speed of an output shaft of the transmission apparatus, and valve means subjected to the pressures of the first and second pressure fluids for moving between first and second positions in accordance with the pressure difference of the pressure fluids acting thereon, said valve means in the first position connecting the first friction engaging device with the supply source of the operating pressure fluid and in the second position connecting the second friction engaging device with the supply source of the operating pressure fluid, said valve means having opposite ends and said first and second pressure fluids acting on said ends in opposite directions, and a manually operable valve means controlling flow of the pressure fluids to the first said valve means, said manually operable valve means having a position corresponding to a low speed stage position, whereat said first valve means is cut off from the supply of the second control pressure fluid and is opened to the atmosphere, whereby said first valve means is urged to the first position by the first control pressure fluid acting thereon.

2. Apparatus as claimed in claim 1 wherein the speed-change mechanism is provided with a first speed stage and a reverse stage, said apparatus further comprising third valve means interposed between said manually operable valve means and said first valve means for selectively blocking passage of the operating pressure fluid to said first valve means when the speed-change mechanism is to be operated in said first speed stage or said reverse stage.

3. Apparatus as claimed in claim 1 wherein said supply source of the first control pressure fluid comprises a slide valve coupled to said supply source of said operating pressure fluid and to the first said valve means for supplying the same with fluid at a pressure related to the position of the slide valve which in turn is related to engine output power.

4. Apparatus as claimed in claim 1 wherein said supply source of the second control pressure fluid comprises a slide valve coupled to said supply source of the operating pressure fluid and to the first said valve means for supplying the same with fluid at a pressure related to the position of the slide valve which in turn is related to the speed of the output shaft of the transmission apparatus.

5. An automatic transmission apparatus of the type having a speed-change mechanism connected to an internal combustion engine and provided with a low speed transmission system operable by a fluid pressure-operated first friction engaging device and a high speed transmission system operable by a fluid pressure-operated second friction engaging device, said apparatus comprising a supply source of an operating pressure fluid, a supply source of a first control pressure fluid having pressure corresponding to engine output power, a supply source of a second control pressure fluid having a pressure corresponding to the speed of an output shaft of the transmission apparatus, and valve means subjected to the pressures of the first and second pressure fluids for moving between first and second positions in accordance with the pressure difference of the pressure fluids acting thereon, said valve means in the first position connecting the first friction engaging device with the supply source of the operating pressure fluid and in the second position connecting the second friction engaging device with the supply source of the operating pressure fluid, said valve means having opposite ends and said first and second pressure fluids acting on said ends in opposite directions and manually operable valve means controlling flow of the pressure fluids to the first said valve means, said manually operable valve means having a position corresponding to a high speed stage position whereat said first valve means is cut off from the supply of the second control pressure fluid and is supplied with operating pressure fluid of comparatively high pressure, whereby said first valve means is urged to said second position, overcoming the pressure of the first control pressure fluid acting thereon.

6. Apparatus as claimed in claim 5 wherein the speed-change mechanism is provided with a first speed stage and a reverse stage, said apparatus further comprising third valve means interposed betwen said manually operable valve means and said first valve means for selectively blocking passage of the operating pressure fluid to said first valve means when the speed-change mechanism is to be operated in said first speed stage or said reverse stage.

7. Apparatus as claimed in claim 5 wherein said supply source of the first control pressure fluid comprises a slide valve coupled to said supply source of said operating pressure fluid and to the first said valve means for supplying the same with fluid at a pressure related to the position of the slide valve which in turn is related to engine output power.

8. Apparatus as claimed in claim 5 wherein said supply source of the second control pressure fluid comprises a slide valve coupled to said supply source of the operating pressure fluid and to the first said valve means for supplying the same with fluid at a pressure related to the position of the slide valve which in turn is related to the speed of the output shaft of the transmission apparatus.

References Cited

UNITED STATES PATENTS

| 2,908,181 | 10/1959 | Smirl | 74—869X |
|---|---|---|---|
| 2,950,629 | 8/1960 | Holdeman et al. | 74—869X |
| 3,142,999 | 8/1964 | Searles et al. | 74—868 |
| 3,181,386 | 5/1965 | Schaefer | 74—868 |

CARLTON R. CROYLE, Primary Examiner

T. C. PERRY, Assistant Examiner